May 30, 1950  E. A. STALKER  2,509,890
JET-PROPELLED AIRCRAFT WITH BOUNDARY LAYER CONTROL
Filed March 13, 1945
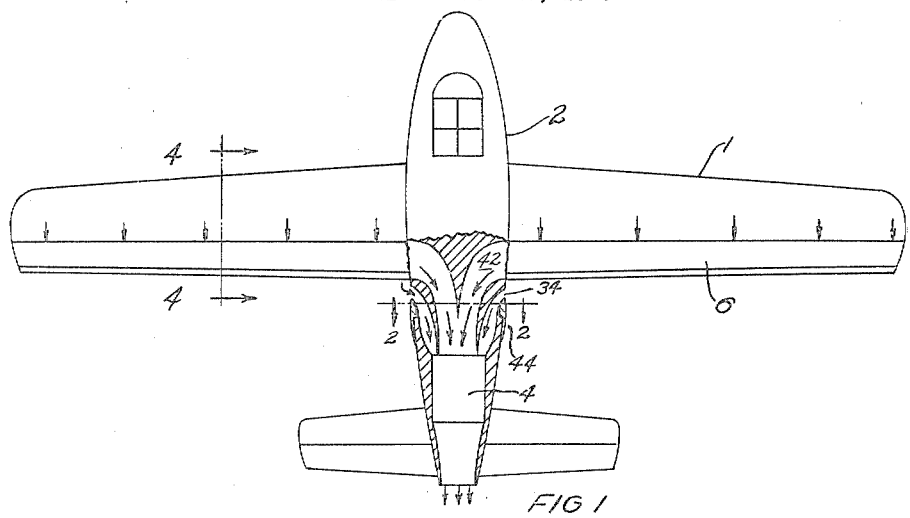
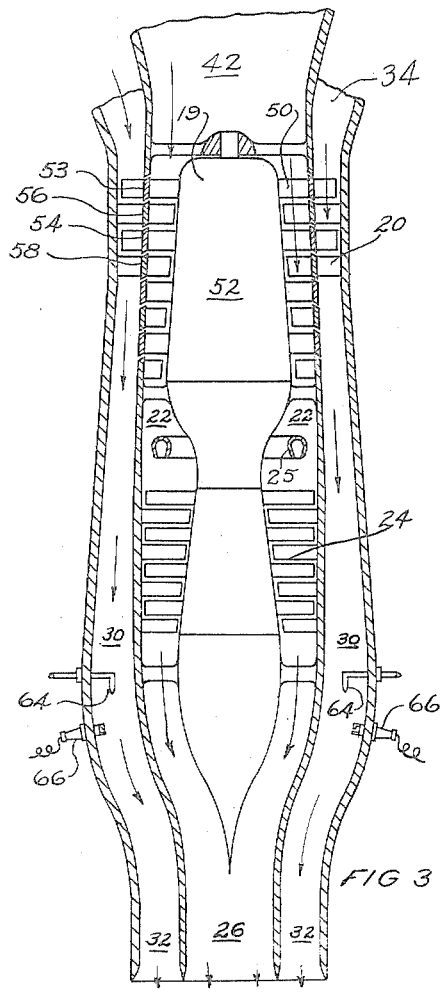
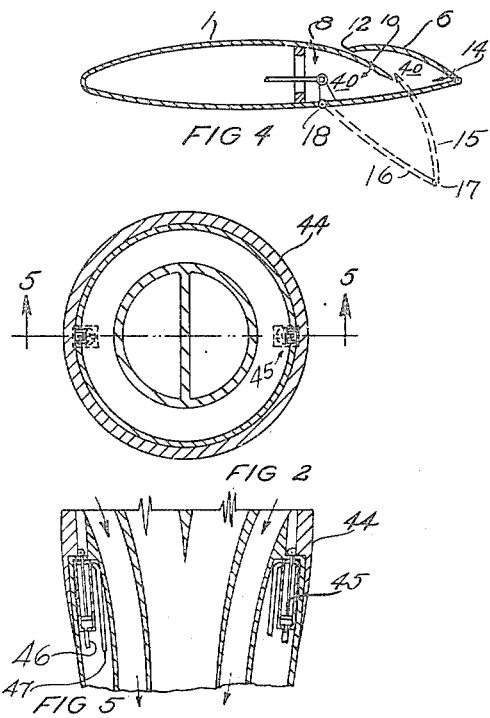
INVENTOR.
Edward A. Stalker Patented May 30, 1950

2,509,890

UNITED STATES PATENT OFFICE 2,509,890

JET-PROPELLED AIRCRAFT WITH BOUNDARY LAYER CONTROL

Edward A. Stalker, Bay City, Mich.

Application March 13, 1945, Serial No. 582,523

4 Claims. (Cl. 244—15)

My invention relates to aircraft and particularly to means of propulsion.

An object of the invention is to provide means of employing the boundary layer air for propelling the aircraft and adapted to increase the maximum lift coefficient at the time of landing.

Another object is to improve the efficiency of propulsion.

Other objects will appear from the description and drawings.

I accomplish the above objects by the means illustrated in the accompanying drawings in which—

Figure 1 is a fragmentary plan view of the aircraft partly in section;

Figure 2 is a section of the fuselage along the line 2—2 in Figure 1;

Figure 3 is an enlarged axial section of the power plant;

Figure 4 is a section along the line 4—4 in Figure 1; and

Figure 5 is a section along the line 5—5 in Figure 2.

This invention is directed to the use of a jet engine to induct the boundary layer for forming the propulsive jet by burning fuel in part of the air after compression and before passing into the turbine of the jet engine. Another part of the boundary layer air passes through the compressor but not through the turbine and may subsequently have fuel burned in it under special conditions.

The jet engine or power plant is adapted to use a large volume of air for take-off and high speed flight while for landing only the boundary layer from the wings is to be used. Thus the quantity of air and the thrust are kept within proper limits for landing with the boundary layer control device in operation to generate high lift.

Referring particularly to the drawings, the wings are 1, the fuselage is 2 and the power plant is 4.

The wings have the flaps 6 which are depressible by a conventional flap mechanism (not shown) to expose the slots 8 and 10 in the aft end of the wing.

With the flap up the wing has the slot 12 formed between the flap leading edge and the wing surface. There is also a slot 14 near the trailing edge of the flap which is open at all times.

The flap is comprised of upper and lower segments 15 and 16 hinged at 17 to each other. The forward edge of the lower segment is hinged at 18 and the forward edge of the upper segment is supported on the upper surface by inverted T-lugs (not shown) whose cross members ride in chordwise slots in the upper forward wall of the main body of the wing.

The power plant is comprised of the inner compressor 19 discharging a part of its compressed air into the combustion chamber 22 and from there into the turbine 24. Fuel is injected into the combustion chamber by the burner 25 to form heated products of combustion or gas which is the motive fluid for the turbine. The gas issues from the turbine through the nozzle 26 as a propulsive jet.

Another part of the inducted air passes through the outer portion 20 of the compressor into the annular passage 30 and is discharged through nozzle 32.

Preferably the air inducted for the turbine is drawn from the wing slots 8, 10 and 14 while the air for passage 30 is drawn from the annular slot 34 in the fuselage.

The air is led from the wing slots to the fuselage by the ducts 40 formed in the wing and the continuation duct 42 in the fuselage.

It will be observed particularly in Figures 1 and 5 that the shroud 44 is slideable forward by the hydraulic jack 45 so as to close the opening in the fuselage. This is done by the pilot at the time of landing when the flaps are lowered by operating a valve controlling the flows in the tubes 46 and 47.

It is very important that the duct from the compressor to the fuselage opening be short since any duct loss will represent a relatively large loss in propulsive efficiency. The loss must be made up by the compressor which has an efficiency substantially less than 100%. In this respect there is a difference from the case of the air flowing through a turbine which has its energy increased by the combustion of fuel. This heat energy is substantially conserved because it is in major part not subject to a loss represented by the inefficiency of the compressor, and the duct losses are therefore a small part of the energy used in the compressor.

When the airplane is landing the amount of air which must be removed from the wing through its slot is of the right amount to serve the turbine. Hence it is possible and desirable to shut off the induction of air through the fuselage slot. If the ducts were interchanged so that the turbine drew air from the fuselage opening it would not be possible to reduce the quantity of air handled for the landing condition since closing the fuselage opening in this case would stop the generation of power necessary for the induction of the boundary layer on the wing.

It is desirable to shut off the flow through the duct 30 so that the thrust from the engine will be reduced to a value which provides the airplane with the proper ratio of thrust to lift. As the lift coefficient of a wing increases the induced drag mounts as the square of the lift. Consequently the ratio of lift to drag declines giving a very steep gliding angle for a large lift coefficient such as here employed. It is therefore desirable to reduce the effect of the drag by opposing it with some thrust but this thrust must not be too large for a low landing speed. The proper thrust is obtained by eliminating the thrust normally arising from the jet from passage 30. To accomplish this, it is necessary that passage 20 be independent of the inner annular passage through compressor 19. It is not sufficient to merely close the inlet 34 without cutting out part of the action of the compressor. If, for instance, there were no division of the compressor into an inner and an outer passage the compressor would simply draw more air from the wing slots when opening 34 was closed. Accordingly the compressor is designed to handle less air which inlet 34 is closed resulting in a smaller jet issuing from 26.

The axial flow compressor 19—20 has a plurality of stages disposed along the axis of rotation. The rotor blades 50 are borne on the central hub 52 with the blades of the first two stages extending into the passage 30—34. At these localities the inner wall of the passage is formed by the rings 53 and 54 fixed to the rotor blades and rotatable with them. The corresponding stator blades are fixed to the outer wall of passage 30—34 and extend inward to the hub. Rings 56 and 58 fixed to the stator blades form the inner wall of 30—34 at the stator positions. The rotating and fixed rings are fitted suitably together to exclude any significant flow from one passage to the other while affording free motion of the rotor rings.

In horizontal flight, particularly at high speed, the efficiency of the jet unit is improved by employing boundary layer air to form the propulsive jet.

It is well known in propeller theory that the ideal efficiency for an aircraft propelled by a propeller can be defined as—

$$\eta = \frac{TV}{T\left(V+\frac{w}{2}\right)} = \frac{1}{1+\frac{w}{2V}} \quad (1)$$

where V is the velocity of flight and $w$ is the total increment of velocity added by the propeller. $T$ = the thrust = the drag $D$. It is to be noted in this case that the air approaches the propeller (or other propulsive device) at the initial velocity V equal to the velocity of flight.

Now consider another aircraft flying with the velocity V but let the velocity of approach of the air to its propulsive device be $V_p$. The energy expended is $$T\left(V_p+\frac{w}{2}\right)$$

The useful energy is still $TV$ as above. Then the efficiency is—

$$\eta_1 = \frac{TV}{T\left(V_p+\frac{w}{2}\right)} \quad (2)$$

Assume that this second aircraft is propelled by a jet emitted from the aircraft at velocity $V_j$. Then—

$$V_j = V_p + w \quad (3)$$

Hence we may write—

$$\eta_2 = \frac{V}{V_p+\frac{V_j-V_p}{2}} = \frac{1}{\frac{V_p}{2V}+\frac{V_j}{2V}} \quad (4)$$

From this equation it is clear that the lower the velocity of approach the greater is the efficiency. In the limiting case let $V_p = 0$ then—

$$\eta = \frac{2V}{V_j} \quad (5)$$

This is equivalent to the efficiency when all the air is carried on board.

In the aircraft it is not possible to carry on board all the air necessary for forming the jet so it is not possible to have $V_p = 0$. However if the boundary layer air is used it has on the average a velocity of $V/2$. If the overall losses amount to 20% the overall efficiency is $$\eta = 0.80 \frac{1}{\frac{1}{4}+\frac{V_j}{2V}} \quad (6)$$

The aircraft could be propelled by a jet velocity $V_j = 1340$ if the $V = 600$ M. P. H. = 880 F. P. S., leading to —

$$\eta_2 = \frac{0.8 \times 1}{0.25+\frac{1340}{1760}} = 79.2\% \quad (7)$$

If the air approached the propulsive device at $V = 880$ F. P. S. the efficiency would be $$\eta_1 = \frac{0.8 \times 1}{1+\frac{1488-880}{1760}} = 59.4\% \quad (8)$$

It is therefore clear that the use of the boundary layer confers a great gain in efficiency of propulsion.

For very high thrust requirements fuel is injected into annular passage 30 by the fuel nozzles 64 spaced around the passage peripherally. The fuel is ignited by the spark plugs 66.

The augmentation of the jet is particularly useful in obtaining a suitable rate of climb with the wing flaps down when the induced drag is normally too large for the normal thrust capacity of the jets from 26 and 32.

The large augmentation of the thrust is also desirable for bursts of speed during combat.

To recapitulate I provide a means of operating an aircraft efficiently throughout the whole regime of flight.

I provide a jet engine which has access to two sources of air, one of which is boundary layer air on the wing.

By using both sources of air the jet engine is given a large thrust adequate to take-off the airplane with an augmented lift coefficient arising from controlling the boundary layer on the wing.

During high speed flight both sources of air are used but one is controllable for adjustment of the air to the speed of flight. The efficiency of propulsion is increased by employing boundary layer air to form the jet.

During landing one source of air is cut off while retaining the communication to the wing slots by the engine inlet supplying air to the turbine. In this manner the boundary layer is controlled on the wings for high lift while providing for a relatively flat gliding angle.

I have now described suitable embodiments of my invention which are now preferred. It is to be understood however that the invention is not limited to the particular construction illustrated and described and that I intend to claim it broadly as indicated by the scope of the appended claims.

I claim:

1. In combination in an aircraft, an aircraft surface having intake means for the induction of the boundary layer, a compressor having walls defining a plurality of inlets and a plurality of separate passages through said compressor, said compressor having one of said inlets in substantially closed communication with said intake means to induct the boundary layer air on said surface to increase the lift of said surface, means placing a second of said inlets in communication with a second source of air at a pressure different from that of said boundary layer air, a gas turbine, means to heat and direct said boundary layer air into said turbine for the extraction of energy thereby, means to apply said energy to said compressor to operate it, means to direct said air from said second inlet rearward as a propulsive jet to increase the thrust, and means to interrupt the flow of air from said second source to said compressor while maintaining the flow from said intake means to provide an increased ratio of lift to thrust.

2. In combination in an aircraft, a wing having surface intake means for the induction of air inwardly therethrough, a fuselage having surface intake means for the induction of air inwardly therethrough, a compressor having a plurality of separate inlets, a flow passage communicating between one of said compressor inlets and said wing surface intake means to induct air therethrough, compressor blades operable in said one inlet, a gas turbine rotor operably connected to drive said compressor, means to deliver compressed air from said compressor through said rotor to produce turbine power, means to heat said compressed air enroute to said rotor, means to discharge said air from said rotor rearwardly as a propulsive jet of exhaust gas, duct means in communication with another of said compressor inlets and said fuselage surface intake means to induct air therethrough, compressor blades operable in said other compressor inlet and connected to said turbine rotor for inducing an inward flow of air through said fuselage surface and outward rearwardly as a propulsive jet, and means to change the relative quantities of air inducted through said wing surface and said fuselage surface respectively.

3. In combination in an aircraft, a wing having a slot in its surface for the induction of the boundary layer, another surface of the aircraft having an opening therein, compressor means to induct two independent streams of air respectively from said slot and from said opening, means in said compressor means for compressing the air of each said stream separately, means to produce combustion in one of said streams of compressed air to form a heated gas, a turbine to receive said gas and derive power therefrom, a nozzle to emit said gas from said turbine to produce a propulsive jet, means for driving said compressor from said turbine, and means to emit the compressed air of the other said stream rearward to form a propulsive jet, the length of the path traversed by the stream from said opening to said compressor means being substantially less than the path for the stream from said slot to said compressor means.

4. In combination in an aircraft, a jet power plant, a wing having a slot in its surface for controlling the boundary layer, an opening in the aircraft for the influx of air, independent duct means respectively communicating between said power plant and each of said slot and said opening for the intake of air to form separate air supplies, combustion means for burning fuel in said respective air supplies, means for separately discharging the products of combustion to form separate rearwardly directed jets, the intake of said air through said wing slot creating a large lift coefficient, and means to substantially reduce the flow of air between said power plant and said opening at the time of landing to reduce the jet thrust to a proper value for said lift coefficient while retaining high lift.

EDWARD A. STALKER.

REFERENCES CITED

The following references are of record in the file of this patent:

UNITED STATES PATENTS

| Number | Name | Date |
|---|---|---|
| 1,986,064 | Leray | Jan. 1, 1935 |
| 2,340,396 | McDonnell | Feb. 1, 1944 |
| 2,383,385 | Heinze | Aug. 21, 1945 |

FOREIGN PATENTS

| Number | Country | Date |
|---|---|---|
| 479,598 | Great Britain | Feb. 7, 1938 |
| 512,064 | Great Britain | Aug. 29, 1939 |
| 523,468 | Great Britain | July 15, 1940 |
| 538,022 | Great Britain | July 17, 1941 |

OTHER REFERENCES

Serial No. 396,458, Richard (A. P. C.) pub. May 25, 1943.